US 9,239,868 B2

(12) United States Patent
Neerincx et al.

(10) Patent No.: US 9,239,868 B2
(45) Date of Patent: Jan. 19, 2016

(54) VIRTUAL SESSION MANAGEMENT AND REESTABLISHMENT

(75) Inventors: Matthew A. Neerincx, Sammamish, WA (US); Luiz F. Santos, Lynnwood, WA (US); Oleg Ignat, Bellevue, WA (US); David B. Lomet, Redmond, WA (US); Quetzalcoatl Bradley, Monroe, WA (US); Raghu Ram, Redmond, WA (US); Chadwin J. Mumford, Woodinville, WA (US); Peter Gvozdjak, Bellevue, WA (US); Balendran Mugundan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 13/527,384

(22) Filed: Jun. 19, 2012

(65) Prior Publication Data

US 2013/0339533 A1    Dec. 19, 2013

(51) Int. Cl.
*G06F 15/16* (2006.01)
*G06F 17/30* (2006.01)
*H04L 29/08* (2006.01)
*G06F 11/20* (2006.01)
*H04L 29/14* (2006.01)

(52) U.S. Cl.
CPC ...... *G06F 17/30566* (2013.01); *G06F 11/2023* (2013.01); *H04L 67/142* (2013.01); *H04L 67/146* (2013.01); *H04L 67/148* (2013.01); *G06F 11/2097* (2013.01); *H04L 69/40* (2013.01)

(58) Field of Classification Search
USPC ................................. 709/213–217, 227–229
See application file for complete search history.

(56) References Cited

U.S. PATENT DOCUMENTS 5,826,085 A    10/1998   Bennett et al.
5,951,694 A     9/1999   Choquier et al.
5,960,436 A     9/1999   Chang et al.
(Continued)

FOREIGN PATENT DOCUMENTS

EP    0554854 A2    8/1993

OTHER PUBLICATIONS

Fecko, Mariusz A., Sunil Samtani, M. Umit Uyar, and Phill T. Conrad. "Designing reliable server pools for battlefield ad-hoc networks." In Proc. IIIS SCI: World Multi-Conf. System. Cybern. Inf vol. 10, pp. 357-362. 2002.*

(Continued)

*Primary Examiner* — Liangche A Wang
*Assistant Examiner* — Melaku Habtemariam
(74) *Attorney, Agent, or Firm* — Nicholas Chen; Micky Minhas

(57) ABSTRACT

Systems and methods are described that establish and maintain a virtual session between a client and one or more database servers. A database server establishes a first session with a client wherein establishing the virtual session with the client comprises associating a virtual session identifier (ID) with the first session, generates state information in association with the first session, and stores the state information in a repository in association with the virtual session ID. After the first session fails, a same or different database server establishes a second session with the client wherein establishing the second session with the client comprises receiving the virtual session ID from the client, accesses the state information that was stored in the repository in association with the virtual session ID, and associates the state information with the second session.

20 Claims, 9 Drawing Sheets

(56) References Cited

U.S. PATENT DOCUMENTS

| | | | |
|---|---|---|---|
| 6,182,086 B1 | 1/2001 | Lomet et al. | |
| 6,199,110 B1 | 3/2001 | Rizvi et al. | |
| 6,314,455 B1 | 11/2001 | Cromer et al. | |
| 6,381,617 B1 | 4/2002 | Frolund et al. | |
| 6,453,354 B1 | 9/2002 | Jiang et al. | |
| 6,463,459 B1 | 10/2002 | Orr et al. | |
| 6,539,494 B1* | 3/2003 | Abramson et al. | 714/4.3 |
| 6,704,778 B1 | 3/2004 | Horman | |
| 6,778,653 B1* | 8/2004 | Kallas et al. | 379/201.02 |
| 6,801,914 B2* | 10/2004 | Barga et al. | 707/674 |
| 6,820,085 B2 | 11/2004 | Nishizawa et al. | |
| 7,231,636 B1 | 6/2007 | Evans | |
| 7,284,155 B2 | 10/2007 | Faihe et al. | |
| 7,343,515 B1 | 3/2008 | Gilbertson et al. | |
| 7,657,782 B2 | 2/2010 | Das et al. | |
| 7,664,879 B2 | 2/2010 | Chan et al. | |
| 7,693,999 B2* | 4/2010 | Park | 709/227 |
| 7,702,947 B2* | 4/2010 | Peddada | 714/4.1 |
| 7,716,274 B1 | 5/2010 | Kumar | |
| 7,765,256 B2 | 7/2010 | Doshi et al. | |
| 7,853,926 B2 | 12/2010 | Blouin et al. | |
| 7,882,173 B2 | 2/2011 | Hirsch et al. | |
| 7,953,883 B2* | 5/2011 | Thomas et al. | 709/231 |
| 8,051,180 B2 | 11/2011 | Mazzaferri et al. | |
| 8,103,779 B2* | 1/2012 | Belkin et al. | 709/227 |
| 2002/0111949 A1 | 8/2002 | Barga et al. | |
| 2002/0152430 A1 | 10/2002 | Akasaka et al. | |
| 2003/0084165 A1 | 5/2003 | Kjellberg et al. | |
| 2003/0145103 A1 | 7/2003 | Pruyne et al. | |
| 2004/0044865 A1 | 3/2004 | Sicola et al. | |
| 2004/0249948 A1 | 12/2004 | Sethi et al. | |
| 2005/0240558 A1 | 10/2005 | Gil et al. | |
| 2006/0075112 A1* | 4/2006 | Polozoff | 709/227 |
| 2006/0123098 A1 | 6/2006 | Asher et al. | |
| 2006/0242286 A1 | 10/2006 | Hawkins et al. | |
| 2007/0174493 A1 | 7/2007 | Irish et al. | |
| 2007/0208862 A1* | 9/2007 | Fox et al. | 709/227 |
| 2008/0033964 A1 | 2/2008 | Richards et al. | |
| 2008/0062863 A1 | 3/2008 | Ginde | |
| 2008/0126831 A1 | 5/2008 | Downey et al. | |
| 2008/0134138 A1 | 6/2008 | Chamieh et al. | |
| 2008/0229023 A1 | 9/2008 | Plamondon | |
| 2008/0301418 A1 | 12/2008 | Khailany et al. | |
| 2009/0083088 A1 | 3/2009 | Mathew et al. | |
| 2009/0113457 A1 | 4/2009 | Sedukhin et al. | |
| 2010/0064130 A1 | 3/2010 | Borisov | |
| 2010/0153702 A1* | 6/2010 | Loveless | 713/151 |
| 2010/0205583 A1 | 8/2010 | Gebhardt et al. | |
| 2011/0055839 A1 | 3/2011 | Alexander et al. | |
| 2011/0060622 A1 | 3/2011 | Piersol et al. | |
| 2011/0113247 A1 | 5/2011 | Panasyuk et al. | |
| 2011/0213821 A1 | 9/2011 | Gentile et al. | |
| 2012/0197925 A1* | 8/2012 | Balagopalan et al. | 707/769 |
| 2013/0066949 A1 | 3/2013 | Colrain et al. | |
| 2013/0066955 A1* | 3/2013 | Neel et al. | 709/203 |
| 2013/0311525 A1 | 11/2013 | Neerincx et al. | |
| 2014/0032491 A1 | 1/2014 | Neerincx et al. | |
| 2014/0032964 A1 | 1/2014 | Neerincx et al. | |
| 2014/0108868 A1 | 4/2014 | Neerincx et al. | |

OTHER PUBLICATIONS

U.S. Appl. No. 13/086,959, filed Apr. 14, 2011, 35 pages.

Barga, et al., "Measuring and Optimizing a System for Persistent Database Sessions", Retrieved at <<http://ieeexplore.ieee.org/stamp/stamp.jsp?tp=&arnumber=914810>>, IEEE International Conference on Data Engineering (ICDE), Heidelberg, Germany, Apr. 6, 2001, p. 21-30.

Sultan, et al., "Recovering Internet Service Sessions from Operating System Failures", In IEEE Internet Computing, vol. 9, Issue 2, Mar. 2005, pp. 17-27.

Balman, et al., "Early Error Detection and Classification in Data Transfer Scheduling", In International Conference on Complex, Intelligent and Software Intensive Systems, Mar. 16, 2009, pp. 457-462.

Wilbur, et al., "Building Distributed Systems with Remote Procedure Call", In Software Engineering Journal, vol. 2, Issue 5, Sep. 1987, pp. 148-159.

Non-Final Office Action received in U.S. Appl. No. 13/471,670, Mail Date: Dec. 18, 2013, Filed Date: May 15, 2012, 18 Pages.

"Oracle@ Application Server Containers for J2EE Services Guide 10g Release 2 (Jan. 2, 2010) for Windows or UNIX", Retrieved on: Dec. 22, 2011, Available at: http://docs.oracle.com/cd/B14099_19/web.1012/b14012/datasrc.htm, 23 Pages.

International Search Report & Written Opinion for PCT Patent Application No. PCT/US2013/052152, Mail Date: Oct. 9, 2013, Filed Date: Jul. 26, 2013, 9 Pages.

Non-final Office Action Issued in U.S. Appl. No. 13/560,468, Mail Date: Nov. 8, 2013, Filed Date: Jul. 27, 2012, 7 Pages.

Notice of Allowance Issued in U.S. Appl. No. 13/560,468, Mail Date: Mar. 6, 2014, Filed Date: Jul. 27, 2012, 8 Pages.

"Smart Error recovery for Database Applications", U.S. Appl. No. 13/653,318, filed Oct. 16, 2012, 36 Pages.

Barga, et al., "Persistent Client-Server Database Sessions", In Proceedings of the 7th International Conference on Extending Database Technology: Advances in Database Technology, Feb. 2000, 15 Pages.

Roehm, et al., "WebSphere Application Server V6 Scalability and Performance Handbook", In IBM Redbooks, May 26, 2005, 369 Pages.

International Search Report & Written Opinion for PCT Patent Application No. PCT/US2013/051751, Mail Date: Oct. 8, 2013, Filed Date: Jul. 24, 2013, 11 Pages.

Lomet, et al., "Efficient Transparent Application Recovery in Client-Server Information Systems", In Proceedings of the ACM SIGMOD International Conference on Management of Data, Jun. 1998, pp. 460-471.

"Idempotent Command Execution", U.S. Appl. No. 13/471,670, filed May 15, 2012, 47 pages.

* cited by examiner

VIRTUAL SESSION MANAGEMENT AND REESTABLISHMENT

BACKGROUND

A database server is a software product that provides database services to software applications in response to requests received therefrom. Such database services may include but are not limited to storing, retrieving, analyzing or manipulating database data. Depending upon the implementation, the software applications may be running on the same machine on which the database server is running or may be running on other machines that are connected to the machine on which the database server is running via one or more networks. To send requests to the database server, an application opens a connection to the database server and establishes therewith what is referred to as a session. A session represents an ongoing interactive information exchange between the application and the database server. A session is set up or established at a certain point in time and then torn down at a later point in time. An established session often involves the sending of more than one message from the application to the database server and from the database server to the application.

After an application has initiated a session with a database server, it may send one or more commands to the database server for execution within the context of the session. At some point in time, the connection between the application and the database server may fail. For example, in a scenario in which the application and the database server are running on different machines, the connection may fail if the machine on which the database server is running is shut down or crashes or if there is a problem with a network that connects the different machines. If the connection fails, then the session also fails. In a conventional implementation, when the session fails, the application must open a new connection with the same database server or an alternate database server and then establish an entirely new session therewith in order to continue executing commands. Any state information that was maintained by the original database server in association with the failed session is lost. Such state information may include temporary results (e.g., temporary tables), transaction state information, a database cursor handle, or other information accumulated by the database server in association with a session to facilitate successful and/or efficient processing of commands received within the context of the session. The requirement of the establishment of an entirely new session and the loss of session state information are undesirable results of a failed connection, as they impair system performance and place additional burdens on both the application and the database server(s).

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
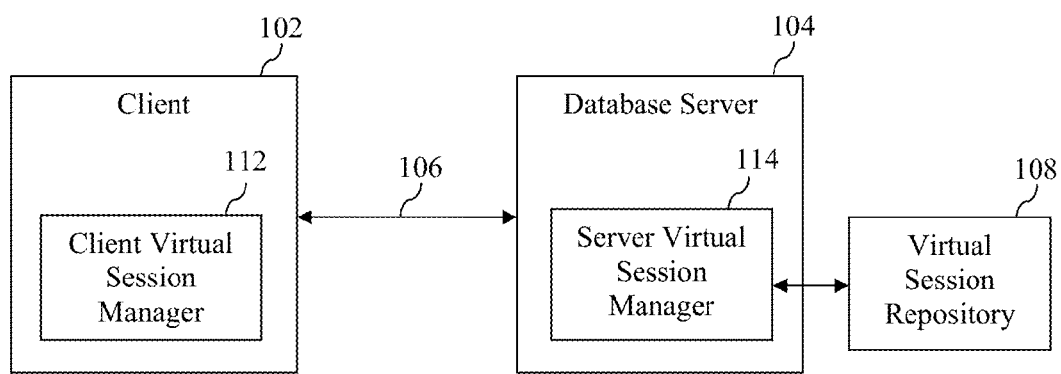
FIG. 1 is a block diagram of an example system that establishes and maintains a virtual session between a client and a database server in accordance with one embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein establish and maintain what is referred to as a "virtual session" to mitigate the adverse effects of a failed connection between a client and a database server. As will be readily understood by persons skilled in the art, a conventional session (also referred to herein as a "physical session") exists only between a particular client and a particular database server. As discussed in the Background Section above, when such a conventional session fails, the client must establish an entirely new session with the database server or with an alternate database server and any state information that was maintained in association with the failed session is lost. In contrast, as will be described herein, a virtual session can be associated with multiple physical sessions between a client and one or more database servers. Furthermore, a virtual session can provide for the persistence of session-related information beyond the failure of a single physical session. Consequently, when a connection between a client and database server breaks such that a first physical session associated with a virtual session fails, the client can establish a second physical session with the database server or with an alternate database server, wherein the second physical session is associated with the same virtual session as the first physical session. The virtual session thus provides a persistent logical connection between the first and second physical sessions. Furthermore, the virtual session allows important information such as session state to be carried over from the first physical session to the second physical session. Thus, the establishment and maintenance of the virtual session enables the client to easily reconnect and continue its work with the same database server or even an alternate database server.

Section II will describe example embodiments in which a virtual session is utilized to mitigate the adverse effects of a failed connection between a client and a database server instance and in which the client reconnects to the same database server instance. Section III will describe example embodiments in which a virtual session is utilized to mitigate the adverse effects of a failed connection between a client and a first database server instance and in which the client reconnects to a second database server instance. In Sections II and III, database-server-side components are used to maintain state information associated with a virtual session. Section IV will describe example embodiments in which the client is utilized to maintain some or all of the session state associated with a virtual session. Section V will describe an example processor-based computer system that may be used to implement various embodiments described herein. Finally, Section VI will provide some concluding remarks.

Although the embodiments described herein are implemented in systems that include database servers, persons skilled in the relevant art(s) will readily appreciate that the concepts described herein can easily be extended to any system in which a session or other ongoing interactive information exchange is established between a first entity and a second entity, and in which state information, or other information is maintained in association therewith. Such systems may include but are not limited to any of a wide variety of client-server systems, peer-to-peer systems, or the like.

II. Example Embodiments Involving a Single Database Server Instance

FIG. 1 is a block diagram of an example system 100 that establishes and maintains a virtual session between a client and a database server in accordance with one embodiment. System 100 is described herein by way of illustration only and is not intended to be limiting. Persons skilled in the relevant art(s) will appreciate that embodiments described herein may be implemented in systems other than system 100.

As shown in FIG. 1, system 100 includes a database server 104 and a client 102 that is communicatively connected thereto via a communication channel 106. Database server 104 is intended to represent an entity that performs operations with respect to data stored in one or more databases that are accessible thereto in response to receiving commands generated by clients, such as client 102, via communication channel 106. The operations performed by database server 104 may include, for example, storing, retrieving, analyzing and/or manipulating database data. Database server 104 may be implemented as software executing on a single machine or across multiple machines. As will be appreciated by persons skilled in the relevant art(s), such machines may comprise physical machines or virtual machines. In one embodiment, database server 104 comprises an instance of MICROSOFT SQL SERVER®, published by Microsoft Corporation of Redmond Wash. However, this is an example only and is not intended to be limiting.

In one embodiment, database server 104 comprises a standalone database server configured to execute commands received from one or more clients, such as client 102. In an alternate embodiment, database server 104 comprises one of a plurality of database server instances running on a cluster of machines and employed to service requests from a plurality of clients, such as client 102, in a manner that allows for failover and high availability. In a further embodiment, database server 104 comprises one of a plurality of database server instances used to implement a cloud database service, such as but not limited to MICROSOFT SQL AZURE™, offered by Microsoft Corporation of Redmond, Wash.

Client 102 is intended to represent an entity that generates and sends commands to database server 104 for execution thereby. Such commands may include, for example, commands to store, retrieve, analyze and/or manipulate database data. Like database server 104, client 102 may be implemented as software executing on one or more machines.

Client 102 and database server 104 may each be executed by different machines that are connected to each other via a particular communication infrastructure. In further accordance with such an implementation, communication channel 106 may be established in a manner that corresponds to the particular communication infrastructure. For example, in an embodiment in which the communication infrastructure comprises a network, such as a local area network (LAN) or wide area network (WAN), well-known networking protocols may be used to establish communication channel 106 between the two machines. As another example, in an embodiment in which database server 104 comprises part of a cloud database service, communication channel 106 may be established via a gateway machine that acts as an intermediary between the machine on which client 102 is running and the machine on which database server 104 is running Still other communication infrastructures and associated methods for establishing communication channel 106 are possible.

It is also possible that client 102 and database server 104 may be executing on the same machine. In accordance with such an implementation, communication channel 106 may comprise a channel that is internal to the machine upon which both entities are executing.

Generally speaking, communication channel 106 is used to transport commands generated by client 102 to database server 104 so that database server 104 may execute such commands Database server 104 may also return requested data, error messages, or other information to client 102 via communication channel 106. In accordance with certain embodiments, the manner in which information is exchanged between client 102 and database server 104 is governed by a standard application layer protocol that is supported by both entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

To interact with database server 104 for the purpose of invoking the database services thereof, client 102 connects to database server 104 and establishes a first session therewith. In one embodiment, database server 104 authenticates client 102 and/or a user thereof as part of establishing the first session. Establishment of the first session also involves associating a virtual session identifier (ID) with the first session and storing the virtual session ID by both client 102 and database server 104. The logic within client 102 that operates to store the virtual session ID is denoted client virtual session manager 112. The logic within database server 104 that operates to store the virtual session ID is denoted server virtual session manager 114. As will be described in more detail herein, these components also perform other operations relating to the establishment and maintenance of a virtual session.

The virtual session ID may be determined in a variety of ways depending upon the implementation. For example, server virtual session manager 114 may generate or select the virtual session ID and then transmit it to client virtual session manager 112. Conversely, client virtual session manager 112 may generate or select the virtual session ID and then transmit it to server virtual session manager 114. Still further, server virtual session manager 114 and client virtual session manager 112 may interact with each other in accordance with some predefined communication protocol to generate or select the virtual session ID.

In one embodiment, the virtual session ID comprises a globally unique ID (GUID) that is unique with respect to a plurality of database server instances rather than with respect to only a single database server instance. Such a GUID may be used to ensure that virtual session ID conflicts are avoided in a case where the maintenance of a particular virtual session is transferred from a first database server instance to a second database server instance. A variety of methods may be used to generate such a GUID. For example, a random number generator may be used to generate a GUID that has a very high likelihood of being unique even among a plurality of database server instances. As another example, the GUID may be selected from a pool of available GUIDs that is accessible to and shared by each database server instance in a plurality of database server instances. As a further example, the GUID may be determined in a collaborative manner via communication between two or more database server instances. These examples are provided by way of illustration only and a variety of other techniques may be used to generate a suitable GUID.

Once the first session has been established between client 102 and database server 104, client 102 may send commands to database server 104 for execution thereby within the context of the first session and database server 104 may return to client 102 results, error codes, or other information in response to executing or attempting to execute such commands. While the first session is active, database server 104 may also generate or obtain state information in association with the session. Generally speaking, this state information may include any information generated or obtained by database server 104 that facilitates successful and/or efficient processing of commands received from client 102 within the context of the first session. Examples of state information include, but are not limited to, temporary results, temporary tables or views, information relating to the state of one or more transactions, a database cursor handle, lock ownership information, or the like.

Server virtual session manager 114 is configured to store such state information in a virtual session repository 108 in association with the virtual session ID that was previously associated with the first session. Generally speaking, virtual session repository 108 comprises a storage device or system that can be accessed by or on behalf of database server 104. For example, virtual session repository 108 may comprise system memory of a machine upon which database server 104 is executing. As another example, virtual session repository 108 may comprise a file system that is part of or accessible to a machine upon which database server 104 is executing. Still other implementations of virtual session repository 108 are possible.

The foregoing operations of client virtual session manager 112 and server virtual session manager 114 enable a virtual session to be established and maintained between client 102 and database server 104. As will now be described, this virtual session can advantageously be used to mitigate the adverse effects of a failed connection between client 102 and database server 104. The connection between client 102 and database server 104 may fail, for example, due to a problem with a network that operates to connect client 102 to database server 104 or for some other reason.

If the connection between client 102 and database server 104 fails, the first session that was previously established between those two entities will fail. However, database server 104 is configured to maintain the state information associated with the first session in virtual session repository 108 for a predetermined amount of time after the connection fails. The amount of time such information is maintained may vary depending upon the implementation.

After the connection fails, client 102 may attempt to reconnect to database server 104 and establish a second session therewith. In one embodiment, database server 104 authenticates client 102 and/or a user thereof as part of establishing the second session. As part of this process, client 102 also provides database server 104 with the virtual session ID that was previously assigned to the first session. If the state information associated with the first session is still being maintained within virtual session repository 108, then database server 104 can use the virtual session ID provided by client 102 to access that state information and associate it with the newly-established second session. In this manner, the state information associated with the failed first session can be carried over from the failed first session to the newly-established second session. This enables client 102 to quickly reconnect to and continue its work with database server 104.

In certain embodiments, when client 102 wishes to terminate a session with database server 104, it sends a message thereto to indicate that the session can be terminated. In response to receiving such a message, database server 104 can tear down the session right away rather than waiting for a timeout to occur. This is in contrast to an implementation in which client 102 closes a session by closing the connection to database server 104.

More information regarding the structure, function and operation of the components of system 100 in accordance with various implementations will now be provided in regard to FIGS. 2-5.

Figure 2:
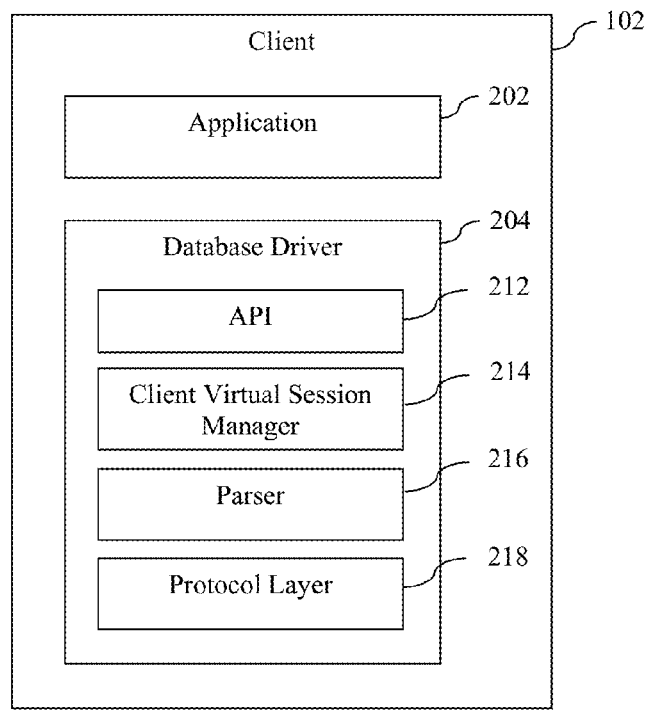
FIG. 2 is a block diagram that illustrates various elements of the client shown in FIG. 1 in accordance with one example embodiment.

In particular, FIG. 2 is a block diagram that illustrates various elements of client 102 in accordance with one example embodiment. As shown in FIG. 2, in the example embodiment, client 102 comprises an application 202 and a database driver 204. Application 202 comprises a software program that enables a user thereof to perform various functions, at least some of which require database operations to be performed. In order to facilitate the performance of such database operations, application 202 is programmed to interact with database driver 204. Database driver 204 comprises a software component that operates to establish a connection between application 202 or any of a variety of other applications and a database server and to utilize such connection for the purpose of obtaining services from the database server.

In one embodiment, database driver 204 provides an application programming interface (API) 212 that can be used by any of a variety of applications to invoke the functionality thereof. As further shown in FIG. 2, database driver 204 also includes a client virtual session manager 214, a parser 216, and a protocol layer 218. Client virtual session manager 214 is intended to represent one implementation of client virtual session manager 112 described above in reference to system 100 of FIG. 1 and thus performs the functions attributed herein to that component. Parser 216 is a software component that is configured to encode commands to be sent to a database server and to interpret information received therefrom in accordance with a particular application layer protocol, such as but not limited to MS-TDS. Protocol layer 218 is intended to represent one or more software component(s) utilized by database driver 204 to carry encoded commands produced by parser 216 to a database server and to receive encoded information therefrom.

In accordance with the embodiment shown in FIG. 2, the functions performed by client virtual session manager 112 in relation to establishing and maintaining a virtual session are performed at the level of database driver 204 rather than at the level of application 202. This is advantageous in that it allows applications that are designed to invoke database driver 204, such as application 202, to reap the benefits of virtual sessions (e.g., the ability to quickly and easily reconnect to and continue working with a database server after a failed connection), while relieving programmers of such applications from having to program the applications to support virtual sessions. Additionally, by incorporating such functionality at the database driver level rather than the application level, embodiments described herein can advantageously reduce the complexity of such applications.

Figure 3:
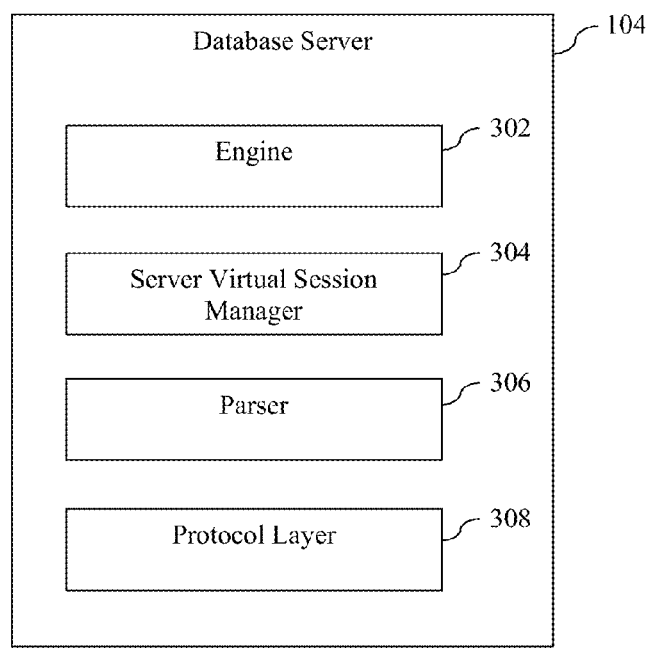
FIG. 3 is a block diagram that illustrates various elements of the database server shown in FIG. 1 in accordance with one example embodiment.

FIG. 3 is a block diagram that illustrates various elements of database server 104 in accordance with a further example embodiment. As shown in FIG. 3, in the further example embodiment, database server 104 comprises an engine 302, a server virtual session manager 304, a parser 306 and a protocol layer 308. Engine 302 comprises a software component that is configured to interact with one or more databases to perform various operations on data stored therein, where such operations include but are not limited to storing, retrieving, analyzing and/or manipulating database data. Server virtual session manager 304 is intended to represent one implementation of server virtual session manager 114 as described above in reference to system 100 of FIG. 1 and thus performs the functions attributed herein to that component. Parser 306 is a software component that is configured to interpret client-generated commands that are received by database server 104 and to encode information to be sent to clients in accordance with a particular application layer protocol, such as but not limited to MS-TDS. Protocol layer 308 is intended to represent one or more software component(s) utilized by database server 104 to carry encoded information produced by parser 306 to the appropriate clients and to receive encoded commands therefrom.

Figure 4:
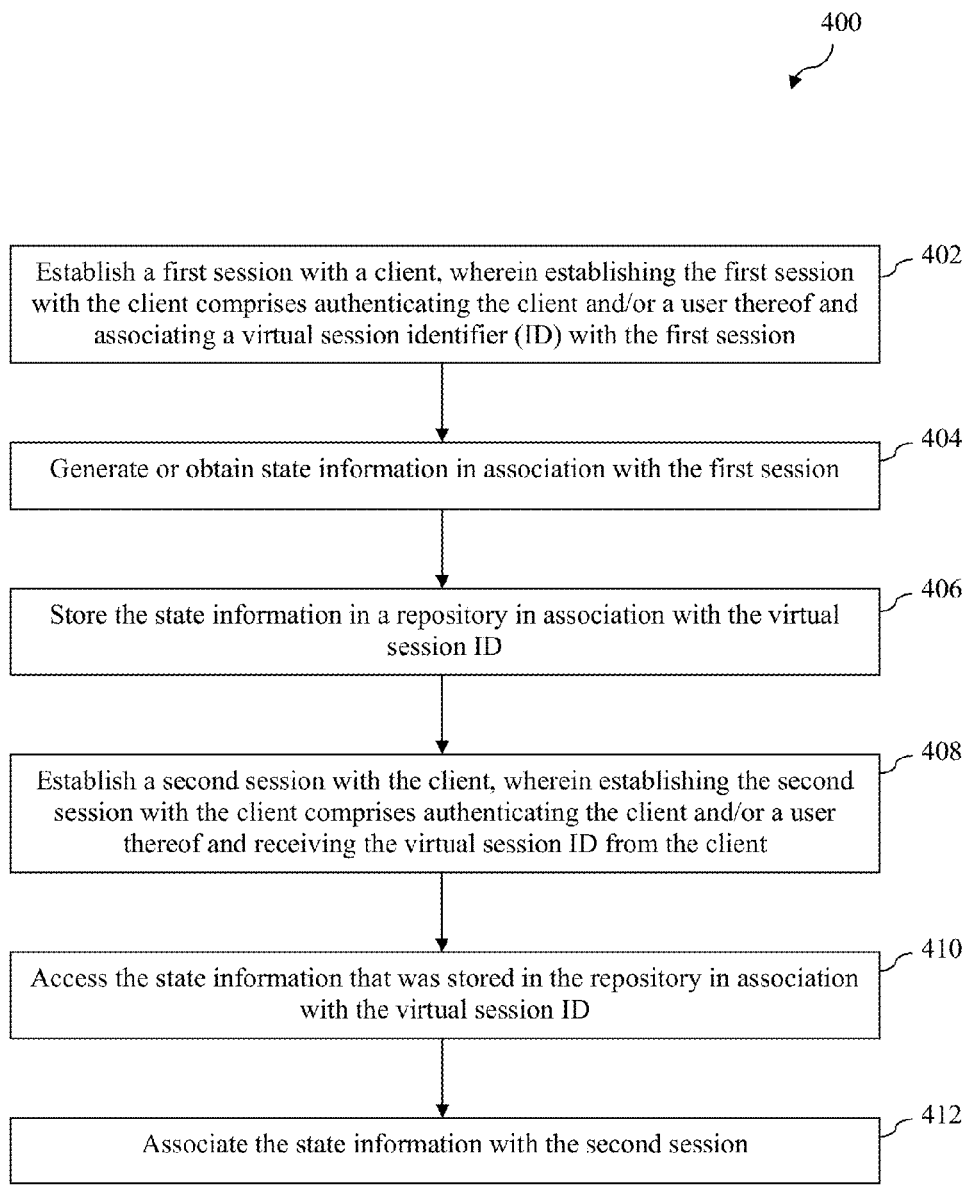
FIG. 4 depicts a flowchart of a method for establishing and maintaining a virtual session by a database server in accordance with an embodiment.

FIG. 4 depicts a flowchart 400 of a method for establishing and maintaining a virtual session by a database server in accordance with an embodiment. The method of flowchart 400 is directed to an embodiment in which a virtual session is utilized to mitigate the adverse effects of a failed connection between a client and a database server instance and in which the client reconnects to the same database server instance. For the sake of illustration, the steps of flowchart 400 will now be described with continued reference to example embodiments described above in reference to FIGS. 1-3. However, the method of flowchart 400 is not limited to those embodiments.

As shown in FIG. 4, the method of flowchart 400 begins at step 402 in which database server 104 establishes a first session with client 102, wherein establishing the first session with client 102 comprises associating a virtual session ID with the first session. As discussed above, the virtual session ID may be generated or selected by client virtual session manager 112, server virtual session manager 114, or through some sort of interaction between such components. Regardless of how the virtual session ID is obtained, it is shared between client virtual session manager 112 and server virtual session manager 114 and stored by both components. As further discussed above, in certain embodiments, the virtual session ID may comprise a GUID that is unique with respect to a plurality of database server instances.

At step 404, database server 104 generates or otherwise obtains state information in association with the first session. As discussed above, such state information may comprise information generated or obtained by database server 104 and used to facilitate successful and/or efficient processing of commands received from client 102 within the context of the first session. Examples of state information include, but are not limited to, temporary results, temporary tables or views, information relating to the state of one or more transactions, a database cursor handle, lock ownership information, or the like. In reference to the example embodiment shown in FIG. 3, such state information may be generated or obtained by engine 302 within database server 104.

At step 406, server virtual session manager 114 stores the state information generated or obtained during step 404 in virtual session repository 108 in association with the virtual session ID.

After step 406, a connection between client 102 and database server 104 fails, thereby resulting in the failure of the first session. This may occur, for example, due to a problem with a network that operates to connect client 102 to database server 104 or for some other reason. Subsequent to such failure, client 102 attempts to reconnect to database server 104 and to establish a second session therewith.

At step 408, database server 104 establishes the second session with client 102. This step includes receiving the virtual session ID from client 102.

At step 410, server virtual session manager 114 within database server 104 uses the virtual session ID received from client 102 to access the state information that was stored in the repository in association therewith during step 404.

At step 412, server virtual session manager 114 within database server 104 associates the state information accessed during step 410 with the second session. By associating the state information accessed during step 410 with the second session, database server 104 can use such state information to facilitate the successful and/or efficient execution of commands subsequently received from client 102 within the context of the second session. This provides for improved continuity of service to client 102, since database server 104 can more quickly resume command execution on behalf of client 102.

In certain embodiments, establishing the first session during step 402 may comprise performing authentication of client 102 and/or a user thereof by database server 104 and establishing the second session during step 408 may comprise performing authentication of client 102 and/or a user thereof by database server 104.

III. Example Embodiments Involving Multiple Database Server Instances

Figure 5:
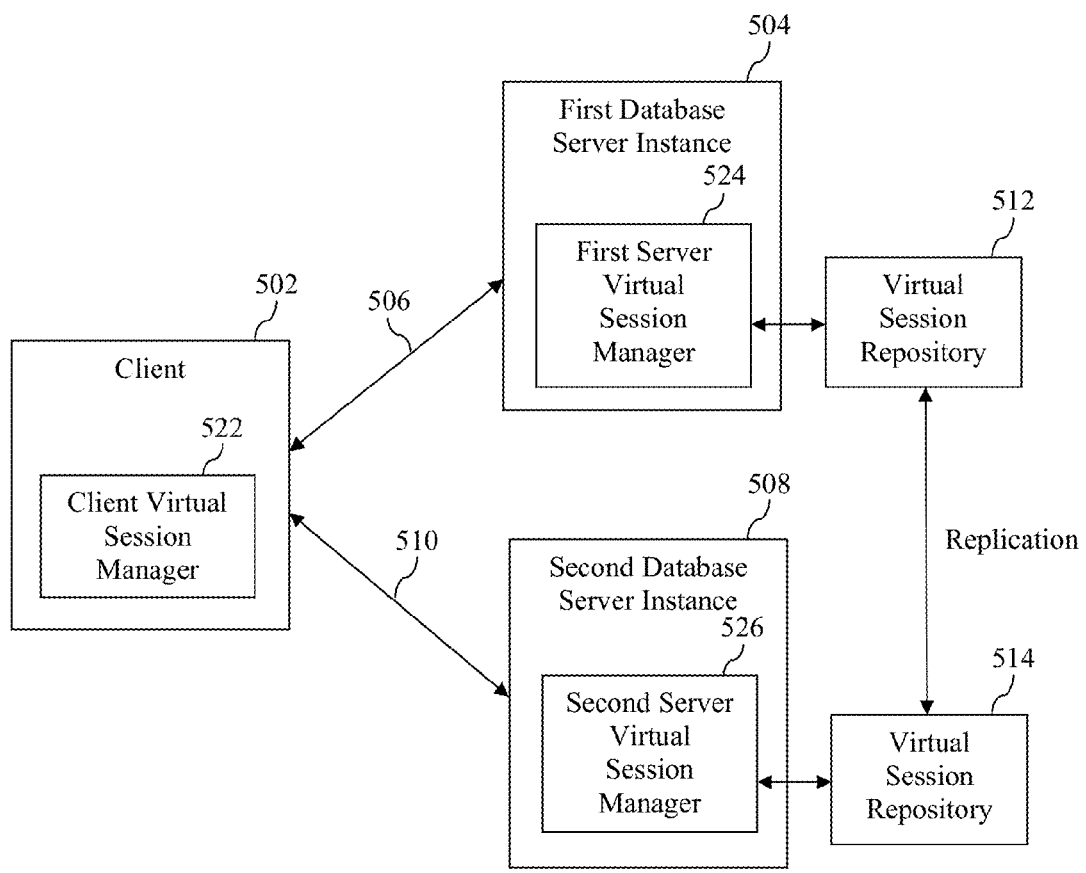
FIG. 5 is a block diagram of an example system that establishes and maintains a virtual session between a client and a first database server instance and the client and a second database server instance in accordance with one embodiment.

FIG. 5 is a block diagram of an example system 500 that establishes and maintains a virtual session between a client and a first database server instance and between the client and a second database server instance in accordance with one embodiment. System 500 is described herein by way of illustration only and is not intended to be limiting. Persons skilled in the relevant art(s) will appreciate that embodiments described herein may be implemented in systems other than system 500.

As shown in FIG. 5, system 500 includes a first database server instance 504, a second database server instance 508, and a client 502. First database server instance 504 and second database server instance 508 are each intended to represent an entity that performs operations with respect to data stored in one or more databases that are accessible thereto in response to receiving commands generated by clients, such as client 502, via a communication channel. The operations performed by first database server instance 504 and second database server instance 508 may include, for example, storing, retrieving, analyzing and/or manipulating database data. Each of first database server instance 504 and second database server instance 508 may be implemented as software executing on a single machine or across multiple machines. As will be appreciated by persons skilled in the relevant art(s), such machines may comprise physical machines or virtual machines. In one embodiment, first database server instance 504 and second database server instance 508 each comprise an instance of MICROSOFT SQL SERVER®, published by Microsoft Corporation of Redmond Wash. However, this is an example only and is not intended to be limiting.

In one embodiment, first database server instance 504 and second database server instance 508 comprise database server instances running on a cluster of machines and employed to service requests from a plurality of clients, such as client 502, in a manner that allows for failover and high availability. In a further embodiment, first database server instance 504 and second database server instance 508 comprise database server instances used to implement a cloud database service, such as but not limited to MICROSOFT SQL AZURE™, offered by Microsoft Corporation of Redmond, Wash.

Client 502 is intended to represent an entity that generates and sends commands to first database server instance 504 via a first communication channel 506 for execution thereby within the context of a first session and, when the first session is broken or otherwise fails, generates and sends commands to second database server instance 508 via a second communication channel 510 for execution thereby within the context of a second session, wherein the first session and the second session are each associated with the same virtual session. The commands generated and sent by client 502 may include, for example, commands to store, retrieve, analyze and/or manipulate database data. Like each of first database server instance 504 and second database server instance 508, client 502 may be implemented as software executing on one or more machines.

Client 502 may be executed on a machine that is separate from the machine(s) on which and first database server instance 504 and second database server instance 508 are running and may be connected thereto via a particular communication infrastructure. In further accordance with such an implementation, each of first communication channel 506 and second communication channel 510 may be established in a manner that corresponds to the particular communication infrastructure. For example, in an embodiment in which the communication infrastructure comprises a network, such as a LAN or WAN, well-known networking protocols may be used to establish each of first communication channel 506 and second communication channel 510. As another example, in an embodiment in which first database server instance 504 and second database server instance 508 comprise part of the same cloud database service, each of first communication channel 506 and second communication channel 510 may be established via a gateway machine that acts as an intermediary between the machine on which client 502 is running and the machine(s) on which first database server instance 504 and second database server instance 508 are running Still other communication infrastructures and associated methods for establishing first communication channel 506 and second communication channel 510 are possible.

It is also possible that client 502 may be executing on the same machine as first database server instance 504 and/or second database server instance 508. In accordance with such an implementation, first communication channel 506 and/or second communication channel 510 may comprise a channel that is internal to a machine upon which client 502 and the database server instance(s) are executing.

Generally speaking, each of first communication channel 506 and second communication channel 510 is used to transport commands generated by client 502 to a corresponding one of first database server instance 504 and second database server instance 508 for execution thereby. Each of first database server instance 504 and second database server instance 508 may also return requested data, error messages, or other information to client 502 via a corresponding one of first communication channel 506 and second communication channel 510. In accordance with certain embodiments, the manner in which information is exchanged between client 5602 and each of first database server instance 504 and second database server instance 508 is governed by a standard application layer protocol that is supported by those entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

To interact with first database server instance 504 for the purpose of invoking the database services thereof, client 502 connects to first database server instance 504 and establishes a first session therewith. In one embodiment, first database server instance 504 authenticates client 502 and/or a user thereof as part of establishing the first session. Establishment of the first session also involves associating a virtual session identifier (ID) with the first session and storing the virtual session ID by both client 502 and first database server instance 504. The logic within client 502 that operates to store the virtual session ID is denoted client virtual session manager 522. The logic within first database server instance 504 that operates to store the virtual session ID is denoted first server virtual session manager 524. As will be described in more detail herein, these components also perform other operations relating to the establishment and maintenance of a virtual session.

The virtual session ID may be determined in a variety of ways depending upon the implementation. For example, first server virtual session manager 524 may generate or select the virtual session ID and then transmit it to client virtual session manager 522. Conversely, client virtual session manager 522 may generate or select the virtual session ID and then transmit it to first server virtual session manager 524. Still further, first server virtual session manager 524 and client virtual session manager 522 may interact with each other in accordance with some predefined communication protocol to generate or select the virtual session ID.

In one embodiment, the virtual session ID comprises a GUID that is unique with respect to a plurality of database server instances that includes at least first database server instance 504 and second database server instance 508. Such a GUID may be used to ensure that virtual session ID conflicts are avoided in a case where the maintenance of a particular virtual session is transferred from one database server instance to another. A variety of methods may be used to generate such a GUID. For example, a random number generator may be used to generate a GUID that has a very high likelihood of being unique even among a plurality of database server instances. As another example, the GUID may be selected from a pool of available GUIDs that is accessible to and shared by at least first database server instance 504 and second database server instance 508. As a further example, the GUID may be determined in a collaborative manner via communication among a plurality of database server instances that includes first database server instance 504 and second database server instance 508. These examples are provided by way of illustration only and a variety of other techniques may be used to generate a suitable GUID.

Once the first session has been established between client 502 and first database server instance 504, client 502 may send commands to first database server instance 504 for execution thereby within the context of the first session and first database server instance 504 may return to client 502 results, error codes, or other information in response to executing or attempting to execute such commands. While the first session is active, first database server instance 504 may also generate or obtain state information in association with the first session. Generally speaking, this state information may include any information generated or obtained by first database server instance 504 that facilitates successful and/or efficient processing of commands received from client 502 within the context of the first session. Examples of state information include, but are not limited to, temporary results, temporary tables or views, information relating to the state of one or more transactions, a database cursor handle, lock ownership information, or the like.

First server virtual session manager 524 is configured to store such state information in a first virtual session repository 512 in association with the virtual session ID that was previously associated with the first session. Generally speaking, first virtual session repository 512 comprises a storage device or system that can be accessed by or on behalf of first database server instance 504. For example, first virtual session repository 512 may comprise system memory of a machine upon which first database server instance 504 is executing. As another example, first virtual session repository 512 may comprise a file system that is part of or accessible to a machine upon which first database server instance 504 is executing. Still other implementations of first virtual session repository 508 are possible.

In the system shown in FIG. 5, the state information stored by first server virtual session manager 524 in first virtual session repository 512 is replicated to a second virtual session repository 614. Such replication may be carried out by a process running on the same machine(s) upon which first database server instance 504 or second database server instance 508 are running or by a process running upon a different machine entirely. Generally speaking, second virtual session repository 514 comprises a storage device or system that can be accessed by or on behalf of second database server instance 508. For example, second virtual session repository 514 may comprise system memory of a machine upon which second database server instance 508 is executing. As another example, second virtual session repository 514 may comprise a file system that is part of or accessible to a machine upon which second database server instance 508 is executing. Still other implementations of second virtual session repository 508 are possible.

The foregoing operations enable a virtual session to be established and maintained that can be used to mitigate the adverse effects of a failed connection between client 502 and first database server instance 504. The connection between client 502 and first database server instance 504 may fail for a variety of reasons, such as but not limited to the shutting down or crashing of a machine on which first database server instance 504 is running or a problem with communication channel 506 that connects client 502 to first database server instance 504.

If the connection between client 502 and first database server instance 504 fails, the first session that was previously established between those two entities will fail. After the connection fails, client 502 may attempt to reconnect to second database server instance 508 and establish a second session therewith. In one embodiment, second database server instance 508 authenticates client 502 and/or a user thereof as part of establishing the second session. As part of this process, client 502 also provides second database server instance 508 with the virtual session ID that was previously assigned to the first session. Second database server instance 508 can then use the virtual session ID provided by client 502 to access the state information associated with the virtual session ID in second virtual session repository 514 and associate it with the newly-established second session. In this manner, the state information associated with the failed first session can be carried over from the failed first session to the newly-established second session. This enables client 502 to quickly reconnect to and continue its work with second database server instance 508.

In certain embodiments, when client 502 wishes to terminate a session with a database server instance, it sends a message thereto to indicate that the session can be terminated. In response to receiving such a message, the database server instance can tear down the session right away rather than waiting for a timeout to occur. This is in contrast to an implementation in which client 502 closes a session by closing the connection to the database server.

Client 502 may be implemented in a like manner to the embodiment of client 102 shown in FIG. 2, such that client virtual session manager 522 comprises part of a database driver. Furthermore, each of first database server instance 504 and second database server instance 508 may be implemented in a like manner to the embodiment of database server 104 shown in FIG. 3.

Figure 6:
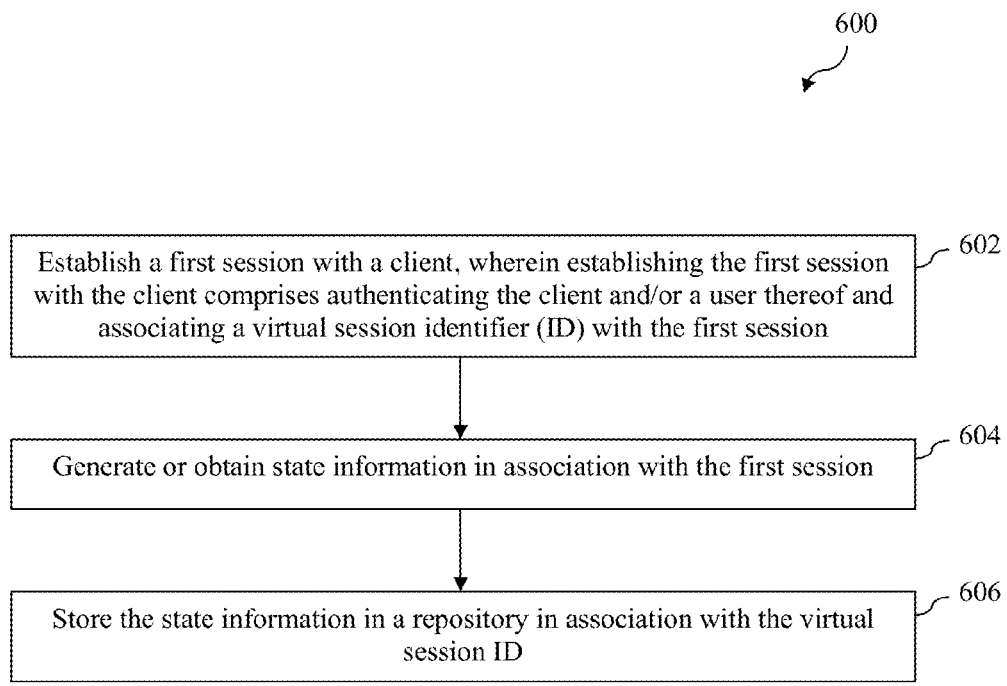
FIGS. 6 and 7 depict flowcharts that collectively illustrate a method for establishing and maintaining a virtual session by two different database server instances in accordance with an embodiment.
Figure 7:
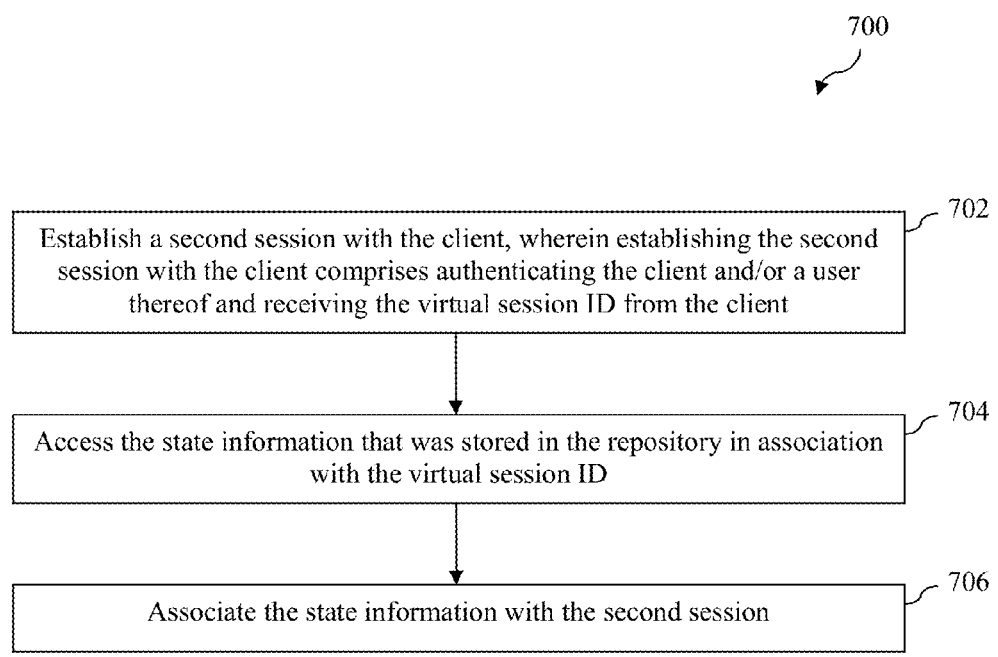

FIGS. 6 and 7 depict flowcharts 600 and 700, respectively, which collectively illustrate a method for establishing and maintaining a virtual session by two different database server instances in accordance with an embodiment. The method illustrated by flowcharts 600 and 700 are directed to an embodiment in which a virtual session is utilized to mitigate the adverse effects of a failed connection between a client and a first database server instance and in which the client reconnects to a second database server instance. For the sake of illustration, the steps of flowcharts 600 and 700 will now be described with continued reference to the example embodiment described above in reference to FIG. 5. However, the methods of flowchart 600 and 700 are not limited to that embodiment.

The method of flowchart 600 will now be described. Each of the steps of this method may be performed by first database server instance 504. As shown in FIG. 6, the method of flowchart 600 begins at step 602 in which first database server instance 504 establishes a first session with client 502, wherein establishing the first session with client 502 comprises associating a virtual session ID with the first session. As discussed above, the virtual session ID may be generated or selected by client virtual session manager 522, first server virtual session manager 524, or through some sort of interaction between such components. Regardless of how the virtual session ID is obtained, it is shared between client virtual session manager 522 and first server virtual session manager 524 and stored by both components. As further discussed above, in certain embodiments, the virtual session ID may comprise a GUID that is unique with respect to a plurality of database server instances.

At step 604, first database server instance 504 generates or otherwise obtains state information in association with the first session. As discussed above, such state information may comprise information generated or obtained by first database server instance 504 and used to facilitate successful and/or efficient processing of commands received from client 502 within the context of the first session. Examples of state information include, but are not limited to, temporary results, temporary tables or views, information relating to the state of one or more transactions, a database cursor handle, lock ownership information, or the like.

At step 606, first server virtual session manager 524 stores the state information generated or obtained during step 604 in a virtual session repository 512 in association with the virtual session ID.

The method of flowchart 700 will now be described. Each of the steps of this method may be performed by second database server instance 508. In one embodiment, subsequent to the performance of the method of flowchart 600 by first database server instance 504 but prior to the performance of the method of flowchart 700 by second database server instance 508, the first session that was established between client 502 and first database server instance 504 fails and client 502 opens a connection to second database server instance 508 to establish a second session therewith. The failure of the first session may occur, for example, due to an intentional or unintentional shut down of a machine upon which first database server instance 504 is executing, a problem with a network that operates to connect client 502 and first database server instance 504, or for some other reason.

The method of flowchart 700 begins at step 702, in which second database server instance 508 establishes the second session with client 502. This step includes receiving the virtual session ID from client 502.

At step 704, second server virtual session manager 526 within second database server instance 508 uses the virtual session ID received from client 502 to access state information that has been stored in second virtual session repository 514 in association with the virtual session ID. As discussed above, second virtual session repository includes a replicated copy of the information that was stored in first virtual session repository 512, and thus includes a copy of the state information that was stored in association with the virtual session ID during step 606 of flowchart 600.

At step 706, second server virtual session manager 526 within second database server instance 508 associates the state information accessed during step 704 with the second session. By associating the state information accessed during step 704 with the second session, second database server instance 508 can use such state information to facilitate the successful and/or efficient execution of commands subsequently received from client 502 within the context of the second session. This provides for improved continuity of service to client 502, since second database server instance 508 can more quickly resume command execution on behalf of client 502.

In certain embodiments, establishing the first session during step 602 of flowchart 600 may comprise performing authentication of client 502 and/or a user thereof by first database server instance 504 and establishing the second session during step 702 of flowchart 700 may comprise performing authentication of client 502 and/or a user thereof by second database server instance 508.

In system 500 of FIG. 5, replication is used to ensure that first server virtual session manager 524 and second server virtual session manager 526 each have access to a repository that includes the same state information stored in association with the same virtual session IDs. However, other approaches may be used to achieve this goal.

Figure 8:
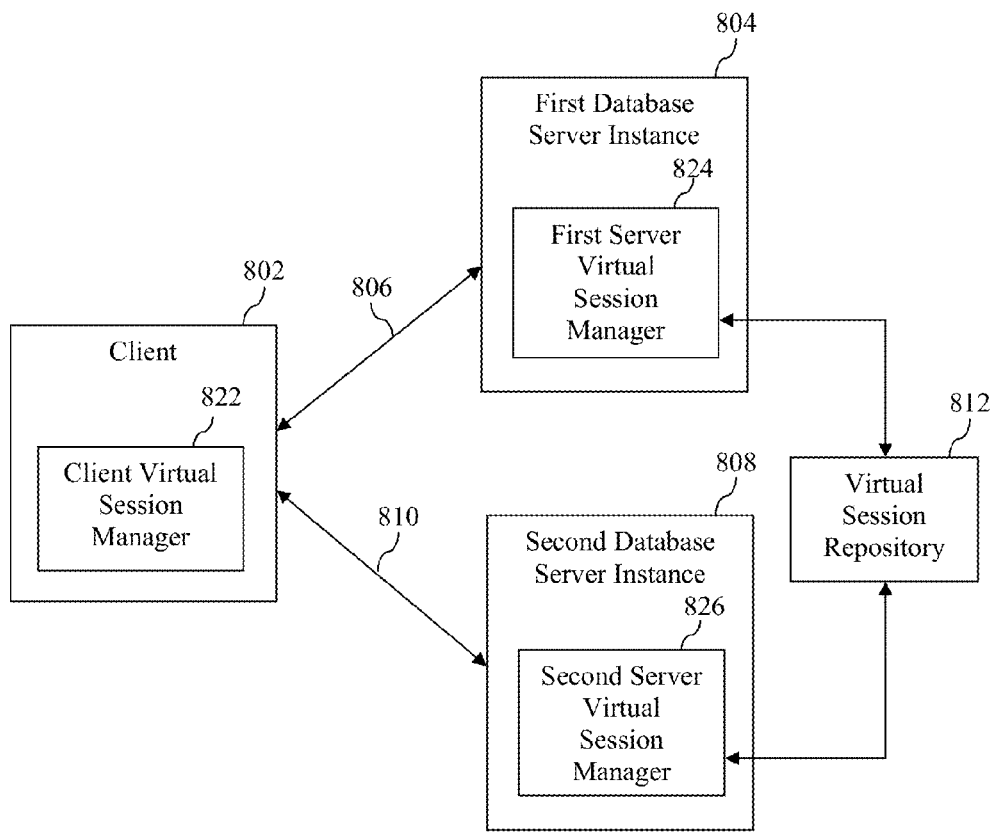
FIG. 8 is a block diagram of an example system that establishes and maintains a virtual session in accordance with an alternate embodiment in which state information is shared between a first database server instance and a second database server instance via use of a shared memory.

For example, FIG. 8 is a block diagram of an example system 800 that utilizes a shared memory approach to achieve the goal. In system 800, client 802, client virtual session manager 822, first database server instance 804, first server virtual session manager 824, second database server instance 808 and second server virtual session manager 826 operate in a substantially similar manner to like-named elements of system 500. However, in system 800, rather than using replication to ensure that second server virtual session manager 826 has access to the same state information that was previously stored by first server virtual session manager 824, a shared virtual session repository 812 is used. In accordance with this approach, first server virtual session manager 824 and second server virtual session manager 826 are both able to access the same virtual session repository 812 and are both configured to store state information thereto and retrieve state information therefrom. Consequently, state information stored in virtual session repository 812 by first server virtual session manager 824 will subsequently be accessible to second server virtual session manager 826.

Figure 9:
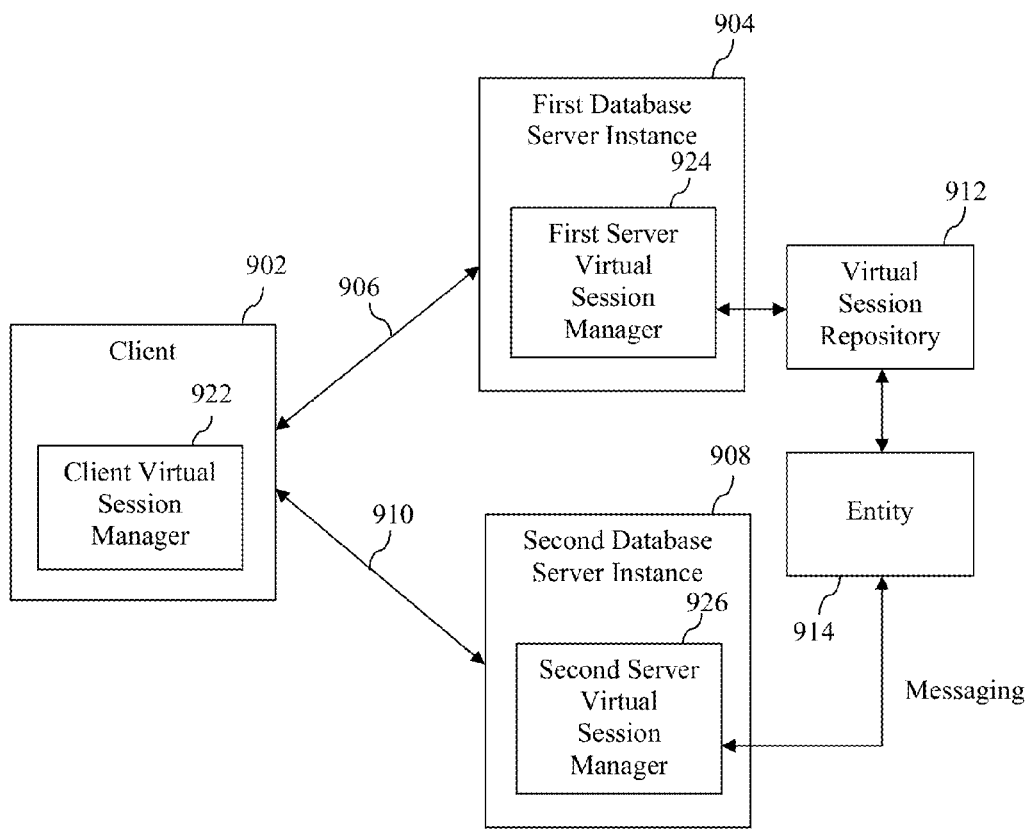
FIG. 9 is a block diagram of an example system that establishes and maintains a virtual session in accordance with an alternate embodiment in which state information is shared between a first database server instance and a second database server instance via messaging.

FIG. 9 is a block diagram of an example system 900 that utilizes a messaging approach to achieve the same goal. In system 900, client 902, client virtual session manager 922, first database server instance 904, first server virtual session manager 924, second database server instance 908 and second server virtual session manager 926 operate in a substantially similar manner to like-named elements of system 500 and system 800. However, in system 900, rather than using replication or a shared repository to ensure that second server virtual session manager 926 has access to the same state information that was previously stored by first server virtual session manager 924, a messaging approach is used. In accordance with this approach, first server virtual session manager 924 is configured to store state information in a virtual session repository 912. When second server virtual session manager 926 determines that it will require access to such state information, it sends messages to an entity 914 having access to virtual session repository 912, and entity 914 sends the required data to second server virtual session manager 926.

IV. Example Embodiments in which State Information is Stored by Client

In Sections II and III, above, database-server-side components are used to maintain state information associated with a virtual session such that it can be persisted from a first session to a second session that shares the same virtual session ID. This section will describe example embodiments in which the client is utilized to maintain some or all of the session state associated with a virtual session. Items of state information that are stored by the client can also be persisted from a first session to a second session that shares the same virtual session ID. Thus, it may not be necessary to use database-server-side components to maintain those items of state information.

For example, in accordance with one embodiment, the method of flowchart 400 further comprises performing the following steps by database server 104. First, during the first session, database server 104 generates further state information in association with the first session, and sends the further state information to client 102 for storage thereby in association with the virtual session ID. Then, during the second session, database server 104 receives the further state information from client 102 in association with the virtual session ID and associates the further state information received from client 102 with the second session.

As another example, in accordance with another embodiment, the method of flowchart 600 further comprises performing the following steps by first database server instance 504 during the first session. First, first database server instance 504 generates further state information in association with the first session. Then, first database server instance 504 sends the further state information to client 502 for storage thereby in association with the virtual session ID. In further accordance with such an embodiment, the method of flowchart 700 further comprises performing the following steps by second database server instance 508 during the second session. First, second database server instance 508 receives the further state information from client 502 in association with the virtual session ID. Then, second database server instance 508 associates the further state information received from client 502 with the second session.

From the client perspective, client 102 may operate in the following fashion. First, client 102 establishes a first session with database server 104, wherein establishing the first session comprises associating a virtual session ID with the first session. Client 102 then stores the virtual session ID. Then, after the first session fails, client 102 establishes a second session with database server 104, wherein establishing the second session comprises associating the virtual session ID with the second session and transmitting the virtual session ID to database server 104. In further accordance with this embodiment, during the first session, client 102 may receive state information associated with the first session from database server 104 and store the state information in association with the virtual session ID. Then, during the second session, client 102 may transmit the state information to database server 104 in association with the virtual session ID.

Furthermore, client 502 may operate in the following fashion. First, client 502 establishes a first session with first database server instance 504, wherein establishing the first session comprises associating a virtual session ID with the first session. Client 502 then stores the virtual session ID. Then, after the first session fails, client 502 establishes a second session with second database server instance 508, wherein establishing the second session comprises associating the virtual session ID with the second session and transmitting the virtual session ID to second database server instance 508. In further accordance with this embodiment, during the first session, client 502 may receive state information associated with the first session from first database server instance 504 and store the state information in association with the virtual session ID. Then, during the second session, client 502 may transmit the state information to second database server instance 508 in association with the virtual session ID.

V. Example Processor-Based System Implementation

Figure 10:
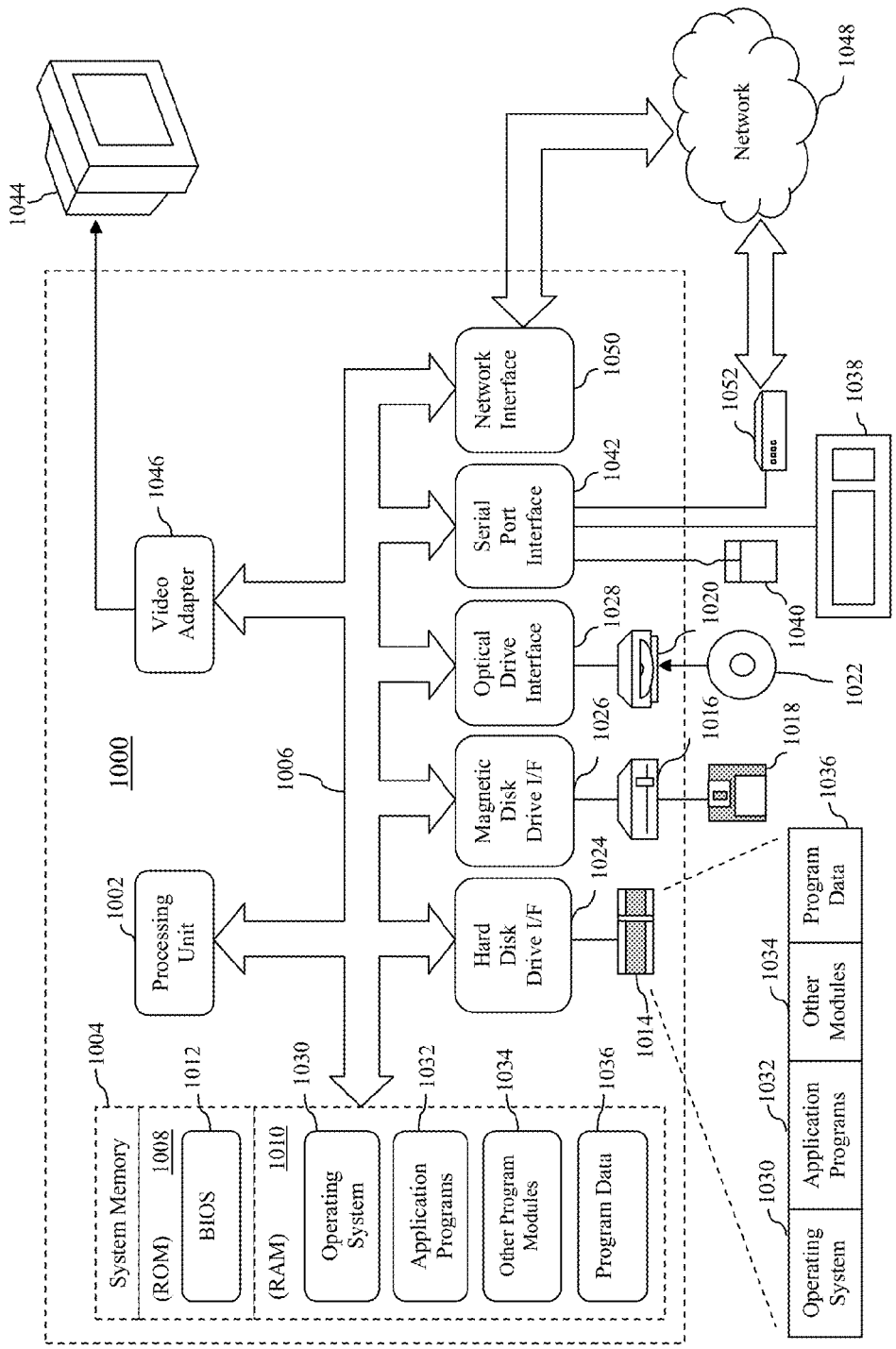
FIG. 10 is a block diagram of an example processor-based system that may be used to implement various embodiments.

FIG. 10 depicts an example processor-based computer system 1000 that may be used to implement various embodiments described herein. For example, system 1000 may be used to implement client 102, database server 104, client 502, first database server instance 504, second database server instance 508, client 802, first database server instance 804, second database server instance 808, client 902, first database server instance 904 or second database server instance 908 as described above in reference to FIGS. 1-3, 5, 8 and 9, as well as various sub-components thereof. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more processors or processing cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of client 102, database server 104, client 502, first database server instance 504, second database server instance 508, client 802, first database server instance 804, second database server instance 808, client 902, first database server instance 904 or second database server instance 908 as described above in reference to FIGS. 1-3, 5, 8 and 9, as well as various sub-components thereof, as described elsewhere herein. The program modules may also include computer program logic that, when executed by processing unit 1002, performs any of the steps or operations shown or described in reference to the flowcharts of FIGS. 4, 6 and 7.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB).

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042.

As used herein, the terms "computer program medium" and "computer-readable medium" are used to generally refer to non-transitory media such as ROM 1008 and RAM 1010 used to implement system memory 1004, the hard disk associated with hard disk drive 1014, removable magnetic disk 1018, removable optical disk 1022, as well as other media such as flash memory cards, digital video disks, and the like.

As noted above, computer programs and modules (including application programs 1032 and other program modules 1034) may be stored on ROM 1008, RAM 1010, the hard disk associated with hard disk drive 1014, the removable magnetic disk 1018, or the removable optical disk 1022. Such computer programs may also be received via network interface 1050 or serial port interface 1042. Such computer programs, when executed by processing unit 1002, enable system 1000 to implement features of embodiments discussed herein. Accordingly, such computer programs represent controllers of system 1000.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of client 102, database server 104, client 502, first database server instance 504, second database server instance 508, client 802, first database server instance 804, second database server instance 808, client 902, first database server instance 904 or second database server instance 908 as described above in reference to FIGS. 1-3, 5, 8 and 9, as well as various sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
a first method performed by a first instance of a database server executing on at least one of one or more machines, the first method comprising:
establishing a first session with a database driver of a client, the establishing the first session with the database driver of the client comprising associating a virtual session identifier (ID) with the first session, wherein the virtual session ID is stored by at least the database driver of the client;
generating state information in association with the first session;
storing the state information in a repository in association with the virtual session ID;
generating further state information in association with the first session; and
sending the further state information to the client for storage thereby in association with the virtual session ID; and
a second method performed by a second instance of the database server executing on the at least one of the one or more machines, the second method comprising:
establishing a second session with the database driver of the client, the establishing the second session with the database driver of the client comprising receiving the virtual session ID from the database driver of the client;
accessing the state information that was stored in the repository in association with the virtual session ID;
associating the state information with the second session;
receiving the further state information from the client in association with the virtual session ID; and
associating the further state information received from the client with the second session, the virtual session ID comprising an ID that is unique with respect to at least both the first instance of the database server and the second instance of the database server.

2. The method of claim 1, wherein the first method further comprises:
generating the virtual session ID; and
transmitting the virtual session ID to the client.

3. The method of claim 1, wherein the first method further comprises:
receiving the virtual session ID from the client.

4. The method of claim 1, wherein the step of establishing the second session with the database driver of the client occurs after the first session fails.

5. The method of claim 1, wherein the repository is stored in a storage medium that is not directly accessible by the second instance of the database server and wherein accessing the state information that was stored in the repository in association with the virtual session ID comprises accessing a replicated copy of the repository that is stored in a storage medium that is accessible to the second instance of the database server.

6. The method of claim 1, wherein the repository is stored in a storage medium that is shared by both the first instance of the database server and the second instance of the database server and wherein accessing the state information that was stored in the repository in association with the virtual session ID comprises accessing the repository in the shared storage medium.

7. The method of claim 1, wherein the repository is stored in a storage medium that is not directly accessible by the second instance of the database server and wherein accessing the state information that was stored in the repository in association with the virtual session ID comprises requesting and receiving information concerning the contents of the repository from an entity that is capable of directly accessing the storage medium.

8. The method of claim 1, wherein the state information comprises one or more of:
   a temporary table;
   transaction state information;
   a database cursor handle; or
   lock ownership information.

9. The method of claim 1, wherein the second method further comprises:
   receiving a message initiated by the client that indicates that the second session is to be terminated; and
   terminating, by the second instance of the database server, the second session in response to receiving the message.

10. A method performed by a database server instance executing on a machine, comprising:
   establishing a first session with a database driver of a client, the establishing the first session with the database driver of the client comprising associating a virtual session identifier (ID) with the first session, wherein the virtual session ID is stored by at least the database driver of the client and is unique with respect to at least the database server instance;
   generating state information in association with the first session;
   storing the state information in a repository in association with the virtual session ID;
generating further state information in association with the first session;
sending the further state information to the client for storage thereby in association with the virtual session ID;
   establishing a second session with the database driver of the client, the establishing the second session with the database driver of the client comprising receiving the virtual session ID from the database driver of the client;
   accessing the state information that was stored in the repository in association with the virtual session ID;
   associating the state information with the second session;
receiving the further state information from the client in association with the virtual session ID; and
associating the further state information received from the client with the second session.

11. The method of claim 10, further comprising:
   generating the virtual session ID; and
   transmitting the virtual session ID to the client.

12. The method of claim 10, further comprising:
   receiving the virtual session ID from the client.

13. The method of claim 10, wherein the step of establishing the second session with the database driver of the client occurs after the first session fails.

14. The method of claim 10, wherein the state information comprises one or more of:
   a temporary table;
   transaction state information;
   a database cursor handle; or
   lock ownership information.

15. The method of claim 10, further comprising:
   receiving a message initiated by the client that indicates that the second session is to be terminated; and
   terminating, by the database server instance, the second session in response to receiving the message.

16. A system, comprising:
   one or more processors;
   a storage medium that stores program modules that are executed by the one or more processors, the program modules comprising:
      an application; and
      a database driver of a client that, when executed by the one or more processors, performs database operations on behalf of the application, the performing the database operations including:
         establishing a first session with a first instance of a database server, the establishing the first session with the first instance of the database server comprising associating a virtual session identifier (ID) with the first session;
         storing the virtual session ID;
         receiving state information associated with the first session, wherein the state information associated with the first session is generated by the first instance of the database server;
         storing the state information in association with the virtual session ID;
         establishing a second session with a second instance of the database server, the establishing the second session with the second instance of the database server comprising associating the virtual session ID with the second session and transmitting the virtual session ID to the second instance of the database server, the virtual session ID comprising an ID that is unique with respect to at least both the first instance of the database server and the second instance of the database server; and
         transmitting the state information to the second instance of the database server in association with the virtual session ID.

17. The method system of claim 16, wherein performing the database operations by the database driver further includes:
   sending a message that causes the second instance of the database server to terminate the second session.

18. The system of claim 16, wherein the state information comprises one or more of:
   a temporary table;
   transaction state information;
   a database cursor handle; or
   lock ownership information.

19. The system of claim 16, wherein storing the state information in association with the virtual session ID comprises:
   storing the state information in a repository in association with the virtual session ID.

20. The system of claim 19, wherein the repository is stored in a storage medium that is not directly accessible by the second instance of the database server.

* * * * *